(12) United States Patent
Ota et al.

(10) Patent No.: US 6,339,642 B1
(45) Date of Patent: *Jan. 15, 2002

(54) TELEPHONE APPARATUS WITH HOWLING PREVENTION FUNCTION

(75) Inventors: Hifumi Ota, Fussa; Shigeru Hiroki, Hiratsuka, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/618,122

(22) Filed: Mar. 19, 1996

(30) Foreign Application Priority Data

Mar. 24, 1995 (JP) ............................................. 7-066013
Feb. 1, 1996 (JP) ............................................. 8-016603

(51) Int. Cl.[7] ................................................ H04M 1/00
(52) U.S. Cl. .................................................. 379/406.01
(58) Field of Search ................................. 379/406, 410, 379/420, 387, 392, 393

(56) References Cited

U.S. PATENT DOCUMENTS

| 4,741,018 A | 4/1988 | Potratz et al. |
| 4,969,181 A | 11/1990 | Ito |
| 5,036,532 A | 7/1991 | Metroka et al. |
| 5,073,928 A | 12/1991 | Shimanuki |
| 5,572,575 A | * 11/1996 | Yamamoto et al. ......... 379/420 |

FOREIGN PATENT DOCUMENTS

| JP | 61-58302 | 3/1986 |
| JP | 2-177649 | 7/1990 |
| JP | 3-248697 | 11/1991 |
| JP | 63-332937 | 12/1998 |

* cited by examiner

Primary Examiner—Jack Chiang
(74) Attorney, Agent, or Firm—Morgan & FinneganLLP

(57) ABSTRACT

A telephone apparatus having a howling preventing function is connected to a communication partner via a telephone exchange and is constructed by a communication unit, including a microphone and a speaker, for communicating with the communication partner, and a preventing unit for preventing howling by the communication unit based on a mode of the communication unit and a signal according to the communication partner received from the telephone exchange.

48 Claims, 7 Drawing Sheets

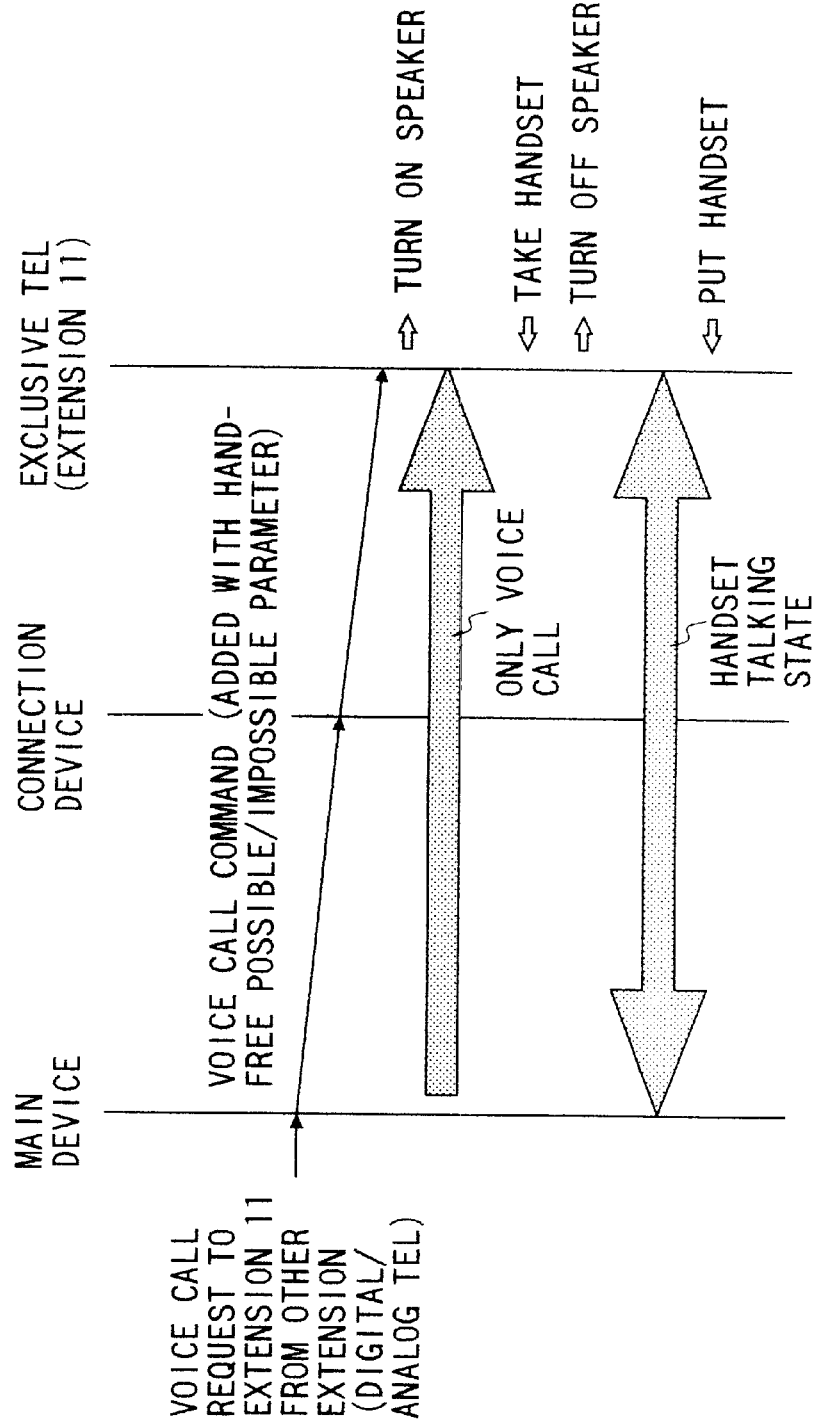

TELEPHONE APPARATUS WITH HOWLING PREVENTION FUNCTION

BACKGROUND OF THE INVENTION

1. Field of the Invention

The present invention relates to a telephone apparatus with a howling preventing function.

2. Related Background Art

In case of performing a hand-free talking, when a 2-line/4-line converting circuit exists between a calling side and a communication partner, howling occurs due to a reflection of a talking signal in the 2-line/4-line converting circuit.

There is a drawback such that an apparatus is expensive when an echo canceller is used to prevent the howling.

SUMMARY OF THE INVENTION

It is an object of the invention to improve a method of preventing a howling.

It is another object of the invention to simplify a construction or control to prevent a howling.

Further another object of the invention is to provide a telephone apparatus which is connected to a communication partner via a telephone exchange and which doesn't turn on a microphone when it is judged that a howling will occur if a speaker and the microphone are turned on.

The above and other objects and features of the present invention will become apparent from the following detailed description and the appended claims with reference to the accompanying drawings.

BRIEF DESCRIPTION OF THE DRAWINGS

FIG. 7 is a sequence diagram in the case where the area for storing the microphone standby state is "OFF".

DETAILED DESCRIPTION OF THE PREFERRED EMBODIMENT

Figure 1:
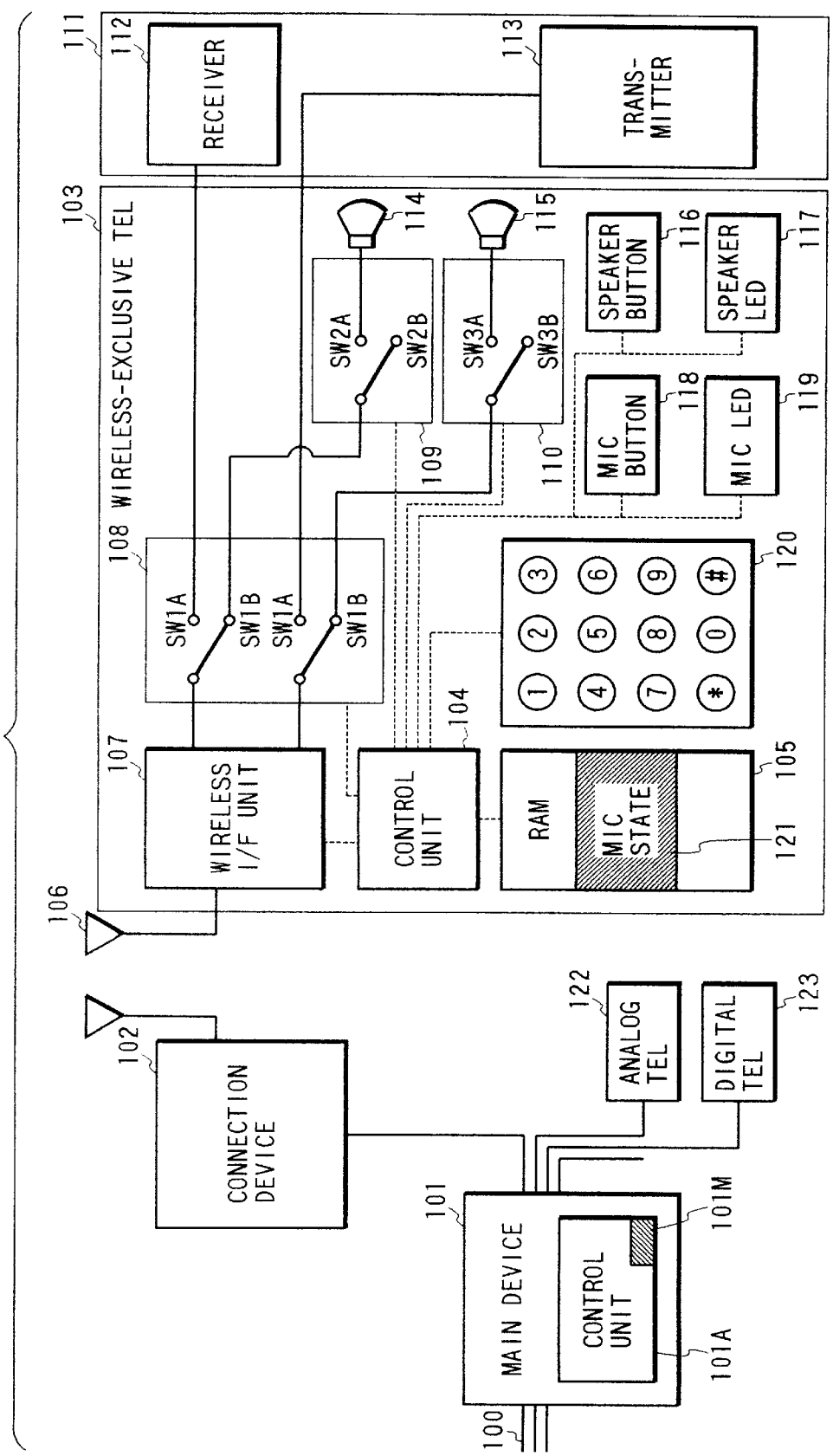
FIG. 1 is a system diagram of a button telephone apparatus of an embodiment.

FIG. 1 is a system diagram of a button telephone apparatus.

Reference numeral 101 denotes a main device of the button telephone apparatus; 101A a control unit of the main device 101; 100 outside lines; 102 a connection device of a wireless telephone; 103 a wireless-exclusive telephone; 104 a control unit for controlling all of the operations of the wireless-exclusive telephone 103; 105 an RAM; 106 an antenna; 107 a wireless interface unit; 108 a switch for switching (a speaker 114 and a microphone 115), and a handset 111; 109 a switch for switching ON/OFF of the speaker 114; 110 a switch for switching ON/OFF of the microphone 115; 111 the handset main body; 112 a receiver; 113 a transmitter; 114 the speaker; 115 the microphone; 116 a speaker button; 117 a speaker LED which is turned on or off by a depression of the speaker button or the like; 118 a microphone button; 119 a microphone LED which is turned on or off by a depression of the microphone button or the like; 120 a dialling button; 121 an area in the RAM for storing a standby state of the microphone 115; 122 an analog telephone; and 123 a digital telephone.

Kinds (analog, digital, exclusive wireless, and the like) of terminals connected to extensions of the main device 101 are stored in a memory 101M in the control unit 101A. The analog telephone 122 is connected to the main device 101 via a 2-line/4-line converting circuit.

Figure 2:
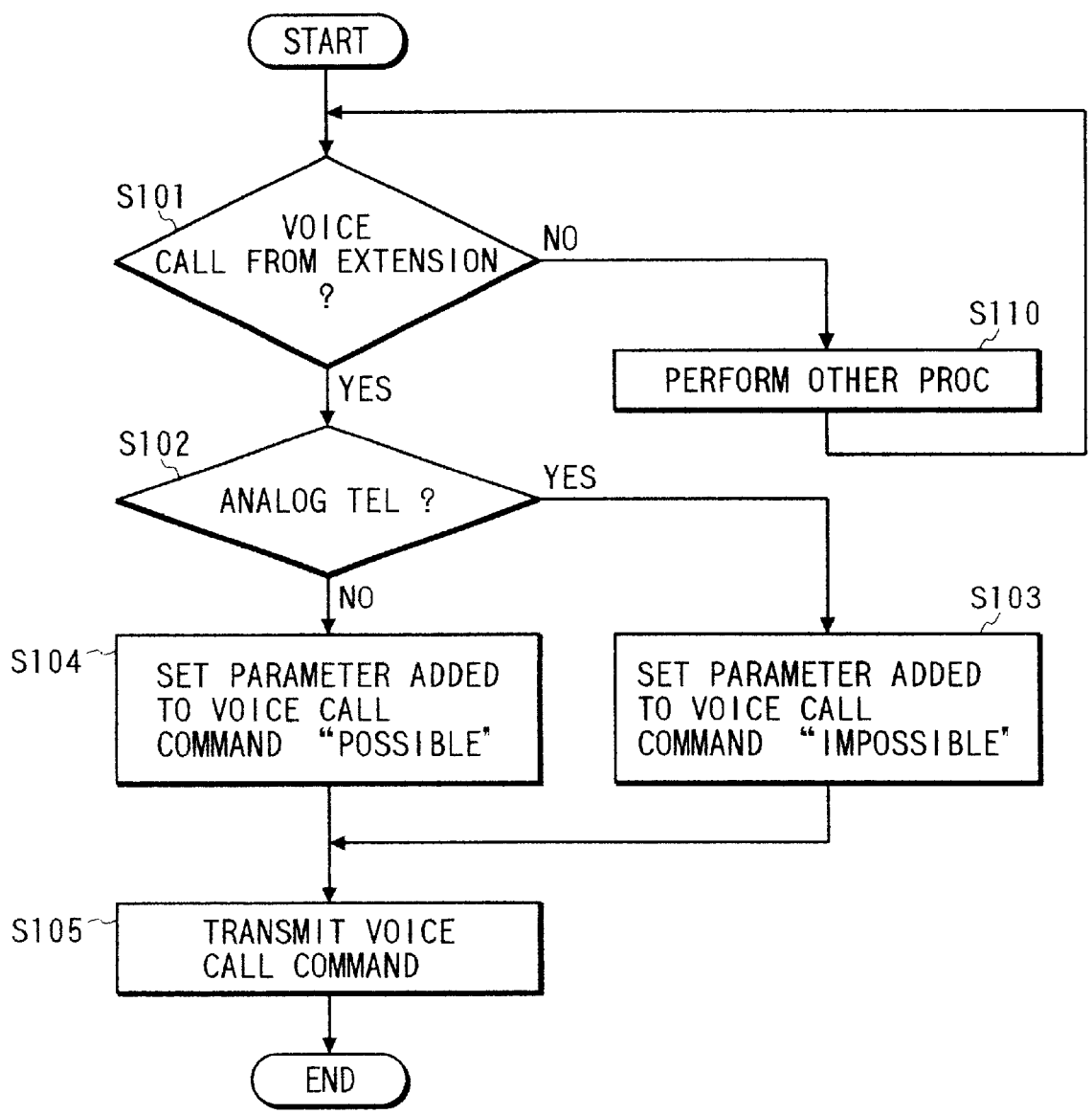
FIG. 2 is a flowchart showing the operation of a main device of the button telephone apparatus of the embodiment.

FIG. 2 is a flowchart for explaining a portion regarding the operation of the main device 101 when there is a voice call (talk back) from an extension.

Figure 3:
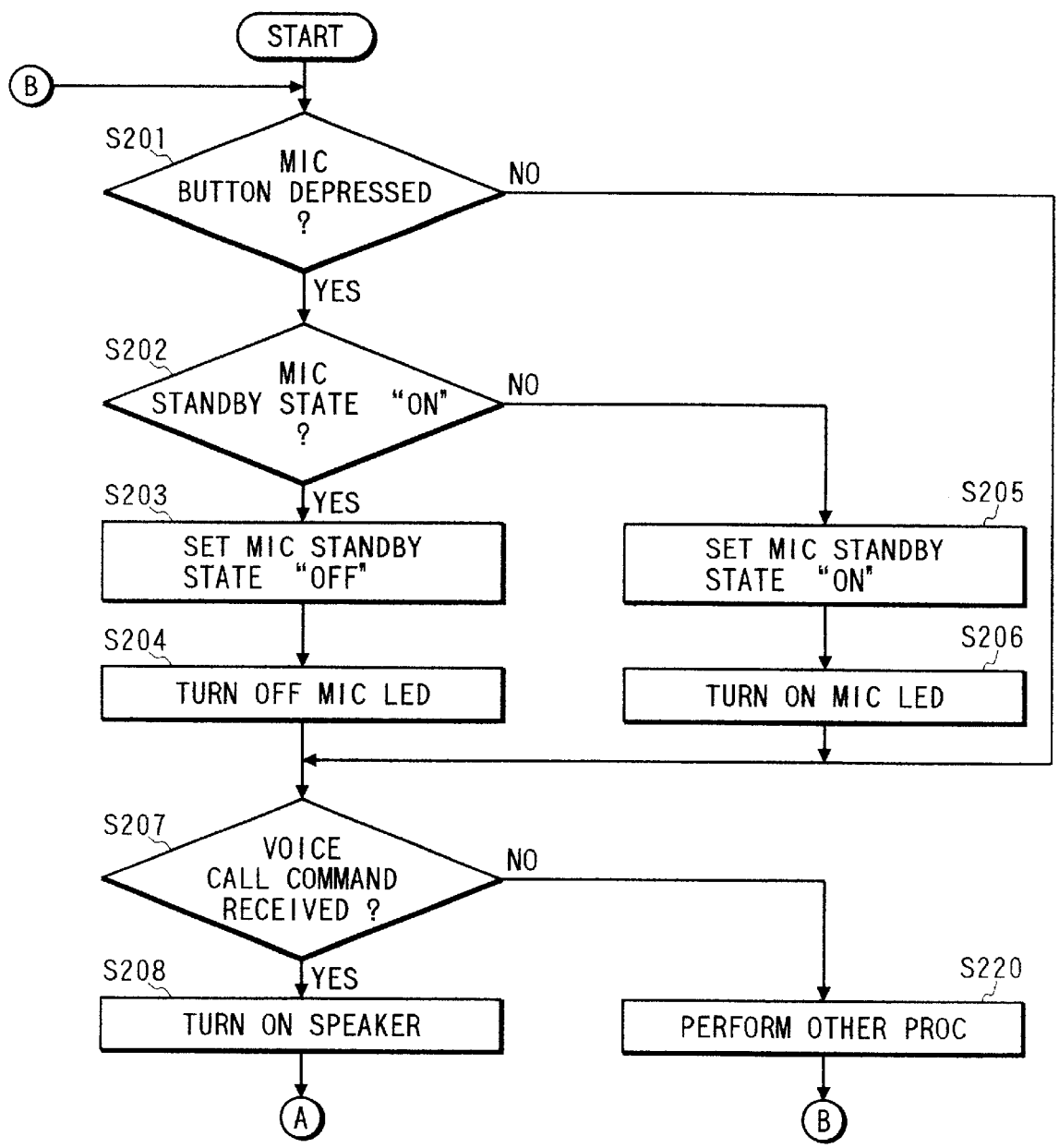
FIG. 3 is a flowchart showing the operation of an exclusive telephone of the button telephone apparatus of the embodiment.
Figure 4:
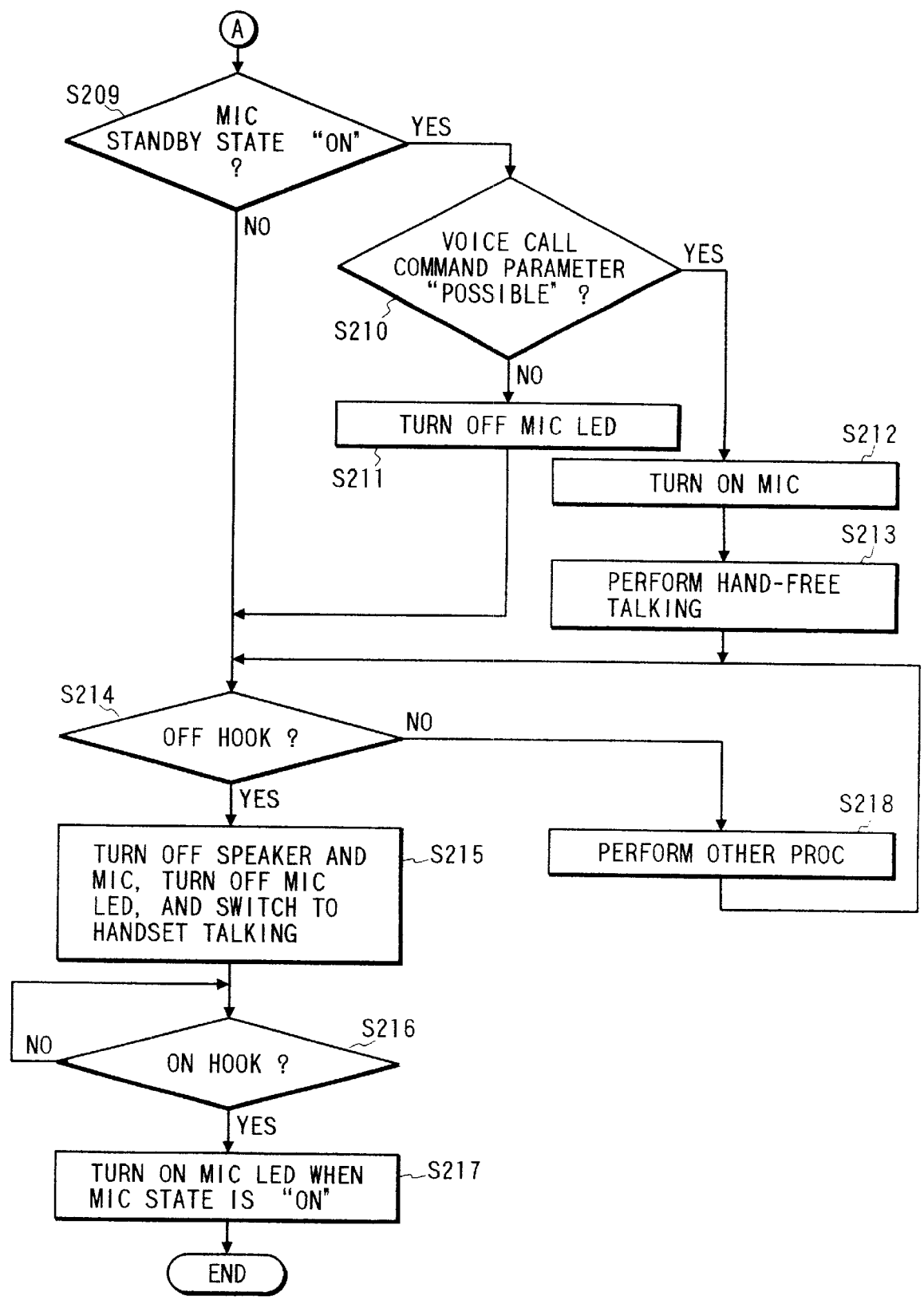
FIG. 4 is a flowchart showing a continuation of the operation of the exclusive telephone of the button telephone apparatus of the embodiment.

FIGS. 3 and 4 are flowcharts for explaining a portion regarding the operation of the wireless-exclusive telephone 103 of the invention. In FIGS. 2 to 4, description of the other operations is omitted.

The operation of the main device 101 of the embodiment will be first described with reference to the flowchart of FIG. 2.

When the voice calling or the voice call (talk back) is received from an arbitrary extension connected to the main device 101 (step S101), the control unit 101A of the main device 101 judges whether the extension on the calling side is an analog telephone which is connected via the 2-line/4-line converting circuit or not (S102). If YES, a value of a parameter which is added to a voice call (talk back) command for transmitting to the wireless-exclusive telephone as a partner to be voice called is set to "impossible" (S103). When the extension is not the analog telephone, the value of the parameter is set to "possible" (S104) and the voice call command added with the parameter is transmitted to the called party, for example, the connection device 102 of the wireless-exclusive telephone 103 (S105).

The operation of the wire-exclusive telephone 103 of the embodiment will now be described with reference to the flowcharts of FIGS. 3 and 4.

When the microphone button 118 is depressed (S201), the control unit 104 checks the area 121 for storing the microphone standby state. When the area for storing the microphone standby state is "ON" (S202), the area for storing the microphone standby state is set to "OFF" (S203) and the microphone LED 119 is turned off (S204).

When the area 121 for storing the microphone standby state is "OFF" (S202), the area for storing the microphone standby state is set to "ON" (S205) and the microphone LED 119 is turned on (S206).

When the voice call command transmitted from the main device 101 in step S105 in FIG. 2 is received through the connection device 102 (S207), the control unit 104 turns on the speaker 114 in the wire-exclusive telephone (the switch 109 is changed to SW2A) (S208) and checks the area 121 for storing the microphone standby state in the RAM 105.

When the area 121 for storing the microphone standby state is "OFF" (S209), the microphone 115 is held in the "OFF" state irrespective of the parameter value of the voice call command (refer to FIG. 7).

When the area 121 for storing the microphone standby state is "ON" (S209), the parameter of the voice call command received from the main device 101 is checked.

Figure 5:
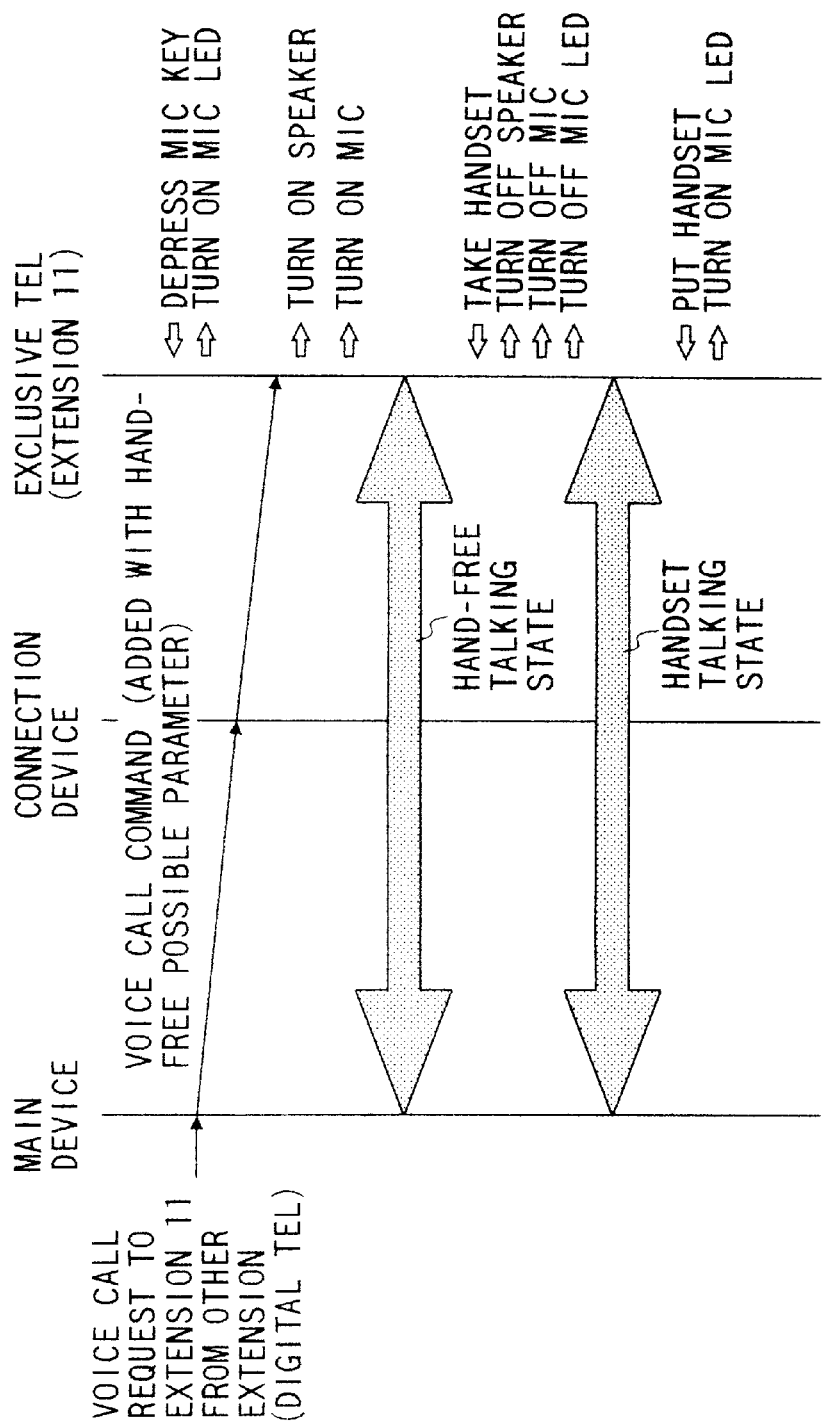
FIG. 5 is a sequence diagram in the case where an area for storing a microphone standby state is "ON" and a parameter of a voice call command is "possible"

When the value of the parameter is set to "possible" (S210), the microphone 115 of the wireless-exclusive telephone is turned "ON" (the switch 110 is changed to SW3A) (S212), thereby performing a hand-free talking (S213) (refer to FIG. 5).

Figure 6:
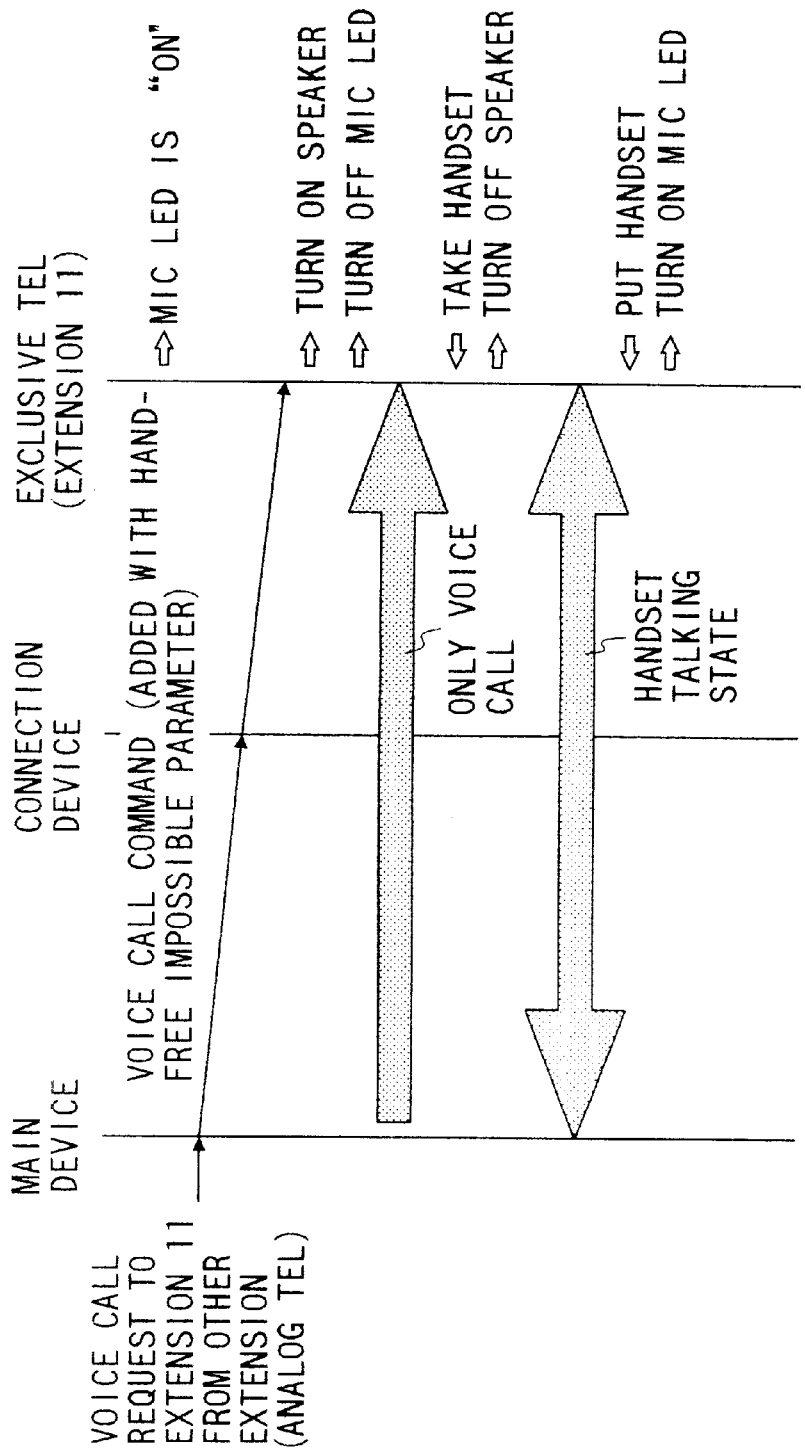
FIG. 6 is a sequence diagram in the case where the area for storing the microphone standby state is "ON" and the parameter of the voice call command is "impossible"

When the area 121 for storing the microphone standby state is "ON" and the value of the parameter is set to "impossible", the microphone LED 119 is turned off (S211) thereby notifying that a microphone talking cannot be performed to a person on the wireless-exclusive telephone 103 side (refer to FIG. 6).

In the case where the microphone button 118 is depressed when the microphone standby state is "OFF" in step S209 and a speaker receiving state (the speaker 114 is "ON" and the microphone 115 is "OFF") is set, the control unit 104 turns on the microphone 115 and microphone LED 119 if the parameter of the voice call command is set to "possible" in a manner similar to steps S210 to S213 (S218). When the parameter of the voice call command is set to "impossible", the microphone 115 and microphone LED 119 is held in the "OFF" state.

When the handset 111 is off-hooked (S214), the microphone 115 and speaker 114 are turned off and the microphone LED 119 is turned off in the case where it is "ON", thereby changing the mode to a handset talking mode (the switch 109 for speaker is switched to SW2B, the switch 110 for microphone is switched to SW3B, and the switch 108 is switched to SW1A) (S215). When the handset is on-hooked (S216), the microphone LED 119 is turned on when the area 121 for storing the microphone standby state is "ON" (S217).

Although the area for storing the microphone standby state is switched by the button in the embodiment, it can be also set by a software switch by a specific operation. In order to display ON/OFF of the area for storing the present standby state, an LCD can be also provided and characters or codes can be displayed on the LCD instead of turning on or off the microphone LED 119.

Although the operation of the voice call has been described above in the embodiment, an operation similar to the above can be also performed when the speaker button 116 is depressed so as to respond to an ordinary call.

That is, when the wireless-exclusive telephone 103 is called by a transmission from an extension or a reception from an outside line in step S110 in FIG. 2, the control unit 101A of the main device 101 transmits a call command including the parameter which is set to "impossible" when the transmitting extension or reception outside line is an analog line and is set to "possible" in the other cases to the wireless-exclusive telephone 103 via the connection device 102.

On the other hand, when the call command is received in step S220, the control unit 104 in the wireless-exclusive telephone 103 makes a ringing. When the speaker button 116 is depressed, the control unit 104 turns on the speaker 114 in a manner similar to steps S208 to S213. When the microphone standby state is "ON" and the parameter included in the call command received from the main device 101 is set to "possible", the control unit 104 turns on the microphone 115, thereby performing the hand-free talking. In the case where the parameter included in the call command is set to "impossible", the control unit 104 turns off the microphone LED 119 even when the microphone standby state is "ON". When the microphone standby state is "OFF", the microphone 115 and microphone LED 119 are held in the "OFF" state irrespective of the value of the parameter included in the call command.

When the speaker button 116 is depressed during the reception ringing, if the microphone standby state is "OFF" and the microphone button 118 is depressed during the speaker reception, the control unit 104 turns on the microphone 115 and microphone LED 119 so long as the parameter included in the call command is set to "possible" in a manner similar to step S218. When the parameter is set to "impossible", the microphone 115 and microphone LED 119 are held in the "OFF" state.

When the speaker button 116 is depressed after a reception call was responded by using the handset 111, an operation similar to the above can be also performed.

When the speaker button 116 is depressed during the handset talking after the reception call was responded by using the handset 111, the control unit 104 changes the switch 108 from SW1A to SW1B in step S220 and turns on the speaker 114 in a manner similar to steps S208 to S213. When the microphone standby state is "ON" and the call command including the parameter of "possible" is received from the main device 101, the control unit 104 turns on the microphone 115, thereby performing the hand-free talking. When the call command including the parameter of "impossible" is received from the main device 101, even if the microphone standby state is "ON", the control unit 104 turns off the microphone LED 119. When the microphone standby state is "OFF", the microphone 115 is held in "OFF". When the microphone button 118 is depressed in such an "OFF" state, if the parameter included in the call command is set to "possible", the control unit 104 turns on the microphone 115 and turns off the microphone LED 119. On the other hand, when the parameter included in the call command is set to "impossible", the microphone 115 and microphone LED 119 are held in the "OFF" state.

Although the invention has been described above with respect to the wireless telephone, the invention can be also applied to a wire telephone for determining the ON/OFF of the microphone in accordance with the notification of "possible" or "impossible" of the hand-free talking from the main device and the operation of the microphone button. The invention is not limited to the construction of the foregoing embodiments but many modifications and variations are possible within the spirit and scope of the appended claims of the invention.

What is claimed is:

1. A telephone apparatus connected to a communication partner via a telephone exchange, comprising:

communication means, including a microphone and a speaker, for communicating with the communication partner; and deciding means for deciding whether an operation for preventing howling by said communication means should be performed or not based on a signal according to a type of the communication partner received from the telephone exchange in a case where the communication partner calls a user of the telephone apparatus through the speaker.

2. An apparatus according to claim 1, wherein said deciding means prevents the howling by setting the microphone off.

3. An apparatus according to claim 1, wherein said deciding means prevents the howling based on the signal and mode of the microphone which is set at a waiting state.

4. An apparatus according to claim 1, wherein the signal according to the type of the communication partner is received from the telephone exchange based on a voice calling.

5. An apparatus according to claim 1, wherein the speaker is turned on based on the voice calling.

6. An apparatus according to claim 1, wherein the mode of said communication means is set by a manual operation at the telephone apparatus.

7. An apparatus according to claim 1, wherein prevention by said deciding means is allowed or inhibited by the signal according to the type of the communication partner.

8. An apparatus according to claim 1, wherein said deciding means prevents the howling based on the signal according to the type of the communication partner in a case where a mode of the microphone is instructed to be on while a mode of the speaker is on.

9. A control method for controlling a telephone apparatus, which has a microphone and a speaker, and which is connected to a communication partner via a telephone exchange, comprising the steps of:
receiving a signal according to a type of the communication partner; and
deciding whether an operation for preventing howling by communication means should be performed or not based on the signal received in said receiving step in a case where the communication partner calls a user of the telephone apparatus through the speaker.

10. An apparatus according to claim 1, wherein the signal is determined by the telephone exchange based on whether the communication partner is an analog telephone.

11. An apparatus according to claim 1, wherein the signal is determined by the telephone exchange based on whether the communication partner is connected to an analog line.

12. An apparatus according to claim 1, wherein said deciding means prevents the howling based on the signal and a mode of said communication means.

13. An apparatus according to claim 1, wherein the signal is included in a calling signal.

14. A method according to claim 9, wherein the signal received in said receiving step is determined by the telephone exchange based on whether the communication partner is an analog telephone.

15. A method according to claim 9, wherein the signal received in said receiving step is determined by the telephone exchange based on whether the communication partner is connected to an analog line.

16. A method according to claim 9, wherein the howling by the microphone is prevented based on the signal and a mode of the microphone.

17. A method according to claim 9, wherein the signal included in a calling signal is received in said receiving step.

18. A method according to claim 9, wherein the howling is prevented by setting the microphone off.

19. A method according to claim 9, wherein the howling is prevented based on the signal and a mode of the microphone which is set at a waiting state.

20. A method according to claim 9, wherein the signal according to the type of the communication partner is received from the telephone exchange based on a voice calling.

21. A method according to claim 9, wherein the speaker is turned on based on the voice calling.

22. A method according to claim 9, wherein the mode of the microphone is set by a manual operation at the telephone apparatus.

23. A method according to claim 9, wherein prevention by said deciding step is allowed or inhibited by the signal according to the type of the communication partner.

24. A method according to claim 9, wherein the howling is prevented based on the signal according to the type of the communication partner in a case where a mode of the microphone is instructed to be on while a mode of the speaker is on.

25. A telephone apparatus comprising:
communication means for communicating with a communication partner; setting means for setting a state of a microphone; and
deciding means for deciding whether an operation for preventing howling by said communication means should be performed or not based on a signal included in a calling signal and the state of the microphone in a case where a speaker is turned on.

26. An apparatus according to claim 25, wherein said deciding means prevents the howling by setting a microphone of said communication means off.

27. An apparatus according to claim 25, wherein said deciding means prevents the howling based on the signal included in a voice calling signal for turning on the speaker.

28. An apparatus according to claim 25, wherein deciding by said preventing means is allowed or inhibited based on the signal.

29. An apparatus according to claim 25, wherein the calling signal is determined based on whether the communication partner is an analog telephone.

30. An apparatus according to claim 25, wherein the calling signal is determined based on whether the communication partner is connected to an analog line.

31. A method for controlling a telephone apparatus, comprising the steps of:
receiving a calling signal; and
deciding whether an operation for preventing howling should be performed or not based on a signal included in the calling signal received in said receiving step and a state of the microphone.

32. A method according to claim 31, wherein the howling is prevented by setting a microphone off.

33. A method according to claim 31, wherein the howling is prevented based on the signal included in a voice calling signal for turning the speaker on.

34. A method according to claim 31, wherein prevention of the howling is allowed or inhibited based on the calling signal.

35. A method according to claim 31, wherein the calling signal is determined based on whether the communication partner is an analog telephone.

36. A method according to claim 31, wherein the calling signal is determined based on whether the communication partner is connected to an analog line.

37. A telephone apparatus for connecting a terminal and a communication partner, comprising:
judging means for judging the communication partner; and
deciding means for deciding whether an operation for preventing howling at the terminal should be performed or not based on the communication partner, in a case where the communication partner calls a user of the terminal through a speaker on the terminal, wherein a predetermined signal is sent to the terminal in the operation.

38. An apparatus according to claim 37, wherein said deciding means prevents the howling based on a type of the communication partner.

39. An apparatus according to claim 37, wherein said deciding means prevents the howling in a case where the communication partner is an analog telephone.

40. An apparatus according to claim 37, wherein said deciding means prevents the howling in a case where the communication partner is connected to an analog line.

41. An apparatus according to claim 37, wherein said deciding means prevents the howling by sending the predetermined signal for setting a microphone of the terminal off.

42. An apparatus according to claim 37, wherein said deciding means sends a calling signal including the predetermined signal to the terminal.

43. A method for controlling a telephone apparatus to which a terminal and a communication partner are connected, comprising the steps of:

judging the communication partner; and deciding whether an operation for preventing howling at the terminal should be performed or not based on the communication partner, in a case where the communication partner calls a user of the terminal through a speaker on the terminal, wherein a predetermined signal is sent to the terminal in the operation.

44. A method according to claim 43, wherein the howling is prevented based on a type of the communication partner.

45. A method according to claim 43, wherein the howling is prevented in a case where the communication partner is an analog telephone.

46. A method according to claim 43, wherein the howling is prevented in a case where the communication partner is connected to an analog line.

47. A method according to claim 43, wherein the howling is prevented by sending the predetermined signal for setting a microphone of the terminal off.

48. A method according to claim 43, wherein a calling signal including the predetermined signal is sent to the terminal.

* * * * *

UNITED STATES PATENT AND TRADEMARK OFFICE
CERTIFICATE OF CORRECTION

PATENT NO. : 6,339,642 B1
DATED : January 15, 2002
INVENTOR(S) : Hifumi Ota et al.

It is certified that error appears in the above-identified patent and that said Letters Patent is hereby corrected as shown below:

<u>Title page,</u>
Item [75], the address for inventor Hifumi Ota should read -- Tokyo --.

Signed and Sealed this

Twenty-fourth Day of September, 2002

*Attest:*

*Attesting Officer*

JAMES E. ROGAN
*Director of the United States Patent and Trademark Office*